United States Patent
Pang et al.

(10) Patent No.: US 10,931,638 B1
(45) Date of Patent: Feb. 23, 2021

(54) AUTOMATED FIREWALL FEEDBACK FROM NETWORK TRAFFIC ANALYSIS

(71) Applicant: Capital One Services, LLC, McLean, VA (US)

(72) Inventors: Brandon Pang, Dunn Loring, VA (US); Ian Mahaney, Bel Air, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/528,054

(22) Filed: Jul. 31, 2019

(51) Int. Cl.
*H04L 29/00* (2006.01)
*H04L 29/06* (2006.01)

(52) U.S. Cl.
CPC .......... *H04L 63/0263* (2013.01); *H04L 63/20* (2013.01)

(58) Field of Classification Search
CPC . H04L 63/0263; H04L 63/20; H04L 63/1433; H04L 29/08819; H04L 29/06605
See application file for complete search history.

(56) References Cited

U.S. PATENT DOCUMENTS

| | | | |
|---|---|---|---|
| 6,826,698 B1 * | 11/2004 | Minkin | H04L 63/0263 709/223 |
| 8,065,719 B2 | 11/2011 | Yang | |
| 9,015,212 B2 * | 4/2015 | David | G06F 3/0611 707/827 |
| 9,369,403 B2 * | 6/2016 | Schultze | H04L 63/20 |
| 10,142,290 B1 * | 11/2018 | Brandwine | H04L 63/0263 |
| 10,142,353 B2 | 11/2018 | Yadav et al. | |
| 10,148,549 B2 | 12/2018 | Rimar et al. | |
| 10,154,049 B2 * | 12/2018 | Sancheti | H04L 63/1416 |
| 10,205,735 B2 | 2/2019 | Apostolopoulos | |
| 10,389,742 B2 * | 8/2019 | Devi Reddy | G06N 7/005 |
| 2004/0250124 A1 * | 12/2004 | Chesla | G06F 21/552 726/13 |
| 2006/0230442 A1 * | 10/2006 | Yang | H04L 63/0263 726/11 |
| 2008/0262990 A1 * | 10/2008 | Kapoor | G06F 9/505 706/20 |
| 2015/0074749 A1 * | 3/2015 | Vasko | G05B 19/4185 726/1 |
| 2015/0135265 A1 * | 5/2015 | Bagrin | H04L 63/0227 726/1 |

(Continued)

FOREIGN PATENT DOCUMENTS

| CN | 201510172735 A | * | 4/2015 | ............ H04L 29/06 |
|---|---|---|---|---|
| CN | 104735084 A | * | 6/2015 | |

*Primary Examiner* — Don G Zhao
(74) *Attorney, Agent, or Firm* — Sterne, Kessler, Goldstein & Fox P.L.L.C.

(57) ABSTRACT

Security rule feedback systems and methods include capturing network traffic data, the network traffic data including a plurality of traffic records. The traffic records are grouped into first and second traffic records having corresponding first and second source address identifiers, first and second source port identifiers, first and second destination address identifiers, and first and second destination port identifiers. Network interfaces associated with the first and second records are identified based on source address identifiers. Security rule populations are associated to the network interfaces. A determination is made as to a direction of network traffic based on the security rule populations. Thereby, dispensable security rules may be identified.

11 Claims, 10 Drawing Sheets

(56) References Cited

U.S. PATENT DOCUMENTS

| | | | |
|---|---|---|---|
| 2016/0050132 A1* | 2/2016 | Zhang | H04L 29/08153 |
| | | | 370/252 |
| 2016/0080243 A1* | 3/2016 | Kodama | H04L 41/0806 |
| | | | 370/252 |
| 2016/0294772 A1* | 10/2016 | Padmanabhan | H04L 63/0263 |
| 2017/0118240 A1* | 4/2017 | Devi Reddy | G06N 7/005 |
| 2017/0171231 A1* | 6/2017 | Reybok, Jr. | H04L 63/0428 |
| 2017/0286664 A1* | 10/2017 | Sakib | G06F 21/44 |
| 2017/0324709 A1 | 11/2017 | Ahn et al. | |
| 2018/0006902 A1* | 1/2018 | Bansal | G06F 11/3476 |
| 2018/0026944 A1* | 1/2018 | Phillips | H04L 63/0263 |
| | | | 726/4 |
| 2018/0027006 A1 | 1/2018 | Zimmermann et al. | |
| 2018/0041470 A1* | 2/2018 | Schultz | H04L 63/029 |
| 2018/0262355 A1* | 9/2018 | Rumyankov | H04L 45/16 |
| 2019/0124094 A1* | 4/2019 | Jusko | H04L 63/1416 |
| 2019/0394170 A1* | 12/2019 | Shameli-Sendi | H04L 63/0218 |

\* cited by examiner

AUTOMATED FIREWALL FEEDBACK FROM NETWORK TRAFFIC ANALYSIS

FIELD

This application relates generally to communication networks and, more specifically, to methods, systems and devices for performing network traffic analysis to identify dispensable firewall rules.

BACKGROUND

One or more instances (e.g., virtual servers) within a private communication network may subscribe to one or more security rule sets to control inbound and outbound traffic. For example, instances within a private cloud network can subscribe to a firewall group, such as a security group including instructions for a virtual firewall. A single instance can belong to one or more security groups. If an instance is not assigned, then it may automatically be assigned to a default security group.

Rules can be added to each security group to control the inbound traffic to instances belonging thereto. A separate set of rules can be assigned to control the outbound traffic.

With the growing popularity of cloud based services, users having a wide range of sophistication and knowledge are being empowered to set up security arrangements. For example, in providing virtual private cloud services, a diverse variety of users and developers may be provided permissions to create security rules, including firewall exceptions. The varying level of sophistication can result in firewall rules exceptions that render the communication network unsecure and present security challenges.

SUMMARY

Some embodiments described herein analyze network traffic at least partially taking place within a specific network, such as a VPC (virtual private cloud). That is, the requester and/or responder may be in the same network. There may be more than one firewall system that traffic must pass through. But there may not be a single firewall system for all nodes. The automated security rule feedback methods and systems described herein analyze resources, such as network interfaces, to make a determination of the specific resource to which they are mapped. For example, a general IP (internet protocol) address involved in a traffic session can be related to a webserver for some application process. Based on the identification of the specific resource, the specific security rules can then be analyzed to determine a direction of network traffic applicable to that session. In some embodiments, security rules that permitted the traffic session to occur are identified based on the determination of the direction of network traffic.

In some embodiments, traffic sessions are grouped into unique pairs of resources, such as network interfaces. In some embodiments, the direction of network traffic can be analyzed by to identify specific rules, i.e., "ingress" rules for the traffic receiver (i.e., the node that may provide a response) and "egress" rules for the traffic requester (i.e., the node that may provide the request).

Some embodiments described herein enable a user to identify dispensable security rules. This result can be enhanced by analyzing two network interfaces each having their own security rule sets (e.g., firewall systems or firewall exceptions). Thereby, rules from two distinct instances or resources (e.g., network interfaces) can be matched per a given traffic session, as opposed to matching rules for a single instance. Traffic sessions can be analyzed based on an arbitrary number of instances or resources.

Further features of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

Figure 1A:
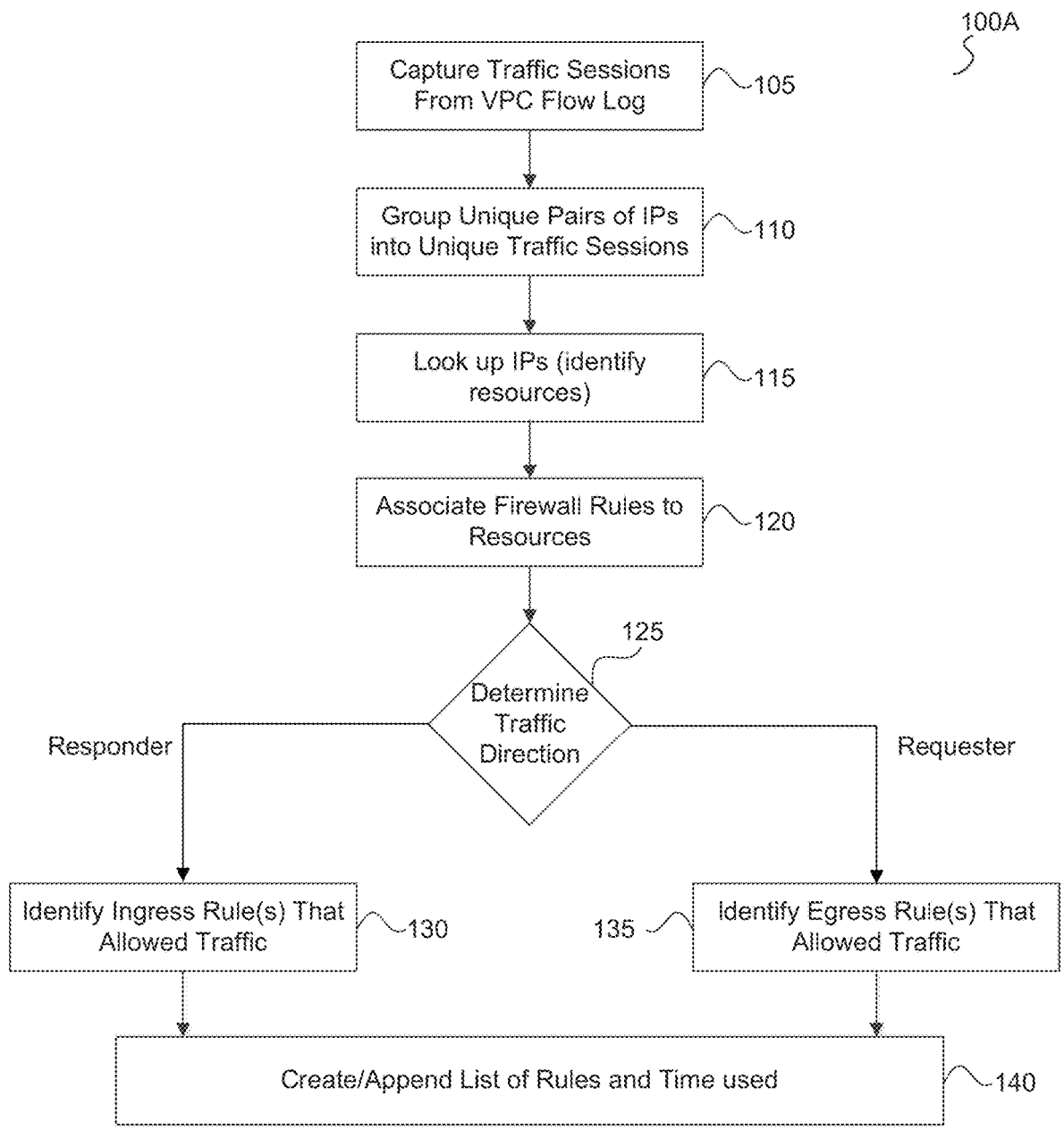
FIGS. 1A and 1B is are flow diagrams of a method for providing automated firewall feedback, according to some embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Computer-Implemented Automated Process for Analyzing Network Traffic Direction

It should be understood that the operations shown in the exemplary methods are not exhaustive and that other operations can be performed as well before, after, or between any of the illustrated operations. In some embodiments of the present disclosure, the operations can be performed in a different order and/or vary.

FIG. 1A is a flow diagram of a method 100 for performing automated security rule feedback, according to some embodiments of the present disclosure. In some embodiments, method 100 provides operational steps to identify whether a rule or node corresponds to a network traffic ingress or egress. In some embodiments, method 100 performs automated security rule feedback by determining a network traffic direction or flow. In some embodiments, method 100 performs automated security rule feedback to identify one or invoked network security rules. Based on the disclosure herein, operations in method 100 can be performed in a different order and/or vary.

At operation 105, traffic sessions can be captured from a flow log (e.g., a network traffic log) of a communication network. Traffic sessions can be captured either by a batch process or by a real time process from a traffic flow log.

At operation 110, one or more records of a network traffic database can be assembled into groups of two traffic records paired by a common address identifier. For example, two traffic records can share corresponding source and destination addresses (and ports) and capture times. Upon determining that two traffic records share corresponding address identifiers, the two traffic records can be categorized as a pair or group in operation 105.

For example, a traffic record may include at least one address identifier identifying a requester or intended recipient (e.g., responder) of a given network traffic session. The traffic record may include at least one port identifying a communication port of the requester or intended recipient of the network traffic session. One or more address identifiers and/or ports provided in a first record can be determined to correspond to one or more address identifier and/or ports provided in a second record. In some embodiments, the grouping may involve a determination of a common capture time shared by the first and second records.

In some embodiments, the traffic record may include a source address and source port and destination address and destination port. The source address and source port and destination address and destination port of a first record can correspond to source address and source port of a second record, and capture time corresponds between the first and second records. In this example, the first record can be identified in a pairing with the second record. For example, destination address and destination port of a first record corresponds to source address and source port of a second record, and capture time can correspond between the first and second records. In an example where the first record is identified in a pairing with the second record, the common address identifier may be a first address identifier of the first record and a second address identifier of the second record.

At operation 115, one or more resources corresponding to each record of a group of traffic records can be identified. In some embodiments, operation 115 includes identifying a resource associated with one or both of the two paired traffic records. In some embodiments, operation 115 performs a query or lookup process. For example, operation 115 may submit a lookup request to a resource database to identify a resource belonging to a given address identifier. In some embodiments, operation 115 can query resources, such as specific equipment, respectively belonging to each address identifier provided in the first record and second record. Based on their respective address identifier, operation 115 can query a resource database to identify a first resource as belonging to the first address identifier and a second resource belonging to the second address identifier.

At operation 120, one or more security rules can be associated to each identified resource. In some embodiments, a first set of security rules is identified to be associated with the first resource and a second set of security rules is identified to be associated with the second resource. In some embodiments, operation 120 includes a query or lookup process including submitting a request to a database to determine which security rule sets are based on a given resource.

At operation 125, a determination can be made by an analyzing process as to what direction traffic flowed for the grouped pair of traffic records. For example, operation 125 can make a determination that the first resource is an egress node (e.g., requester) and that the second resource is the ingress node (e.g., responder). The determination can be based on analyzing the first set of security rules and the second set of security rules. In some embodiments, the determination can be based on an analysis of the identification of associated resources, such as the resource, the rule sets to which the resource is assigned (e.g., a webserver rule set, database server rule set, and the like), the network traffic records themselves, or by any other information pertaining to identification of an ingress or egress characteristics of a group of traffic records.

At operations 130 and 135, the respective rules of the first and second set of security rules can be analyzed to determine one or more specific rules that enabled the network traffic underlying the group of traffic records to occur. For example, in operation 130, if the second NIC is determined to be the ingress node, then the rules applicable to ingress traffic of the second set of security rules can be analyzed. A determination can be made based on the grouped records, such as the second IP address and second port, as to what specific subset of rules of the second set of security rules permitted the traffic session to occur.

In some embodiments, at operation 135, if the first NIC is determined to be the egress node, then the of rules applicable to egress traffic of the first set of security rules can be analyzed. Thereby, a determination can be made based on the first record, similar to operation 130 above, as to what specific rules of the first set of security rules permitted the traffic.

At operation 140, the specific rules identified in operation 130 and operation 135 can be provided as an output. The output can be provided, for example, by writing, modifying or appending a database, other table of records, or other notification platform (e.g., email notification, push notification, stream processing system, or the like). At operation 140, a capture time, such as a start time and an end time, for the analyzed traffic session can also be provided in the output. The capture time can be in UNIX time format, for example. In some embodiments, this output can be provided to enable a query to be performed, alone or in combination with another database, such as a network traffic database, a resources database, a security rules database. A query can enable a user to identify redundant or unused security rules that may be dispensable or considered for removal.

Figure 1B:
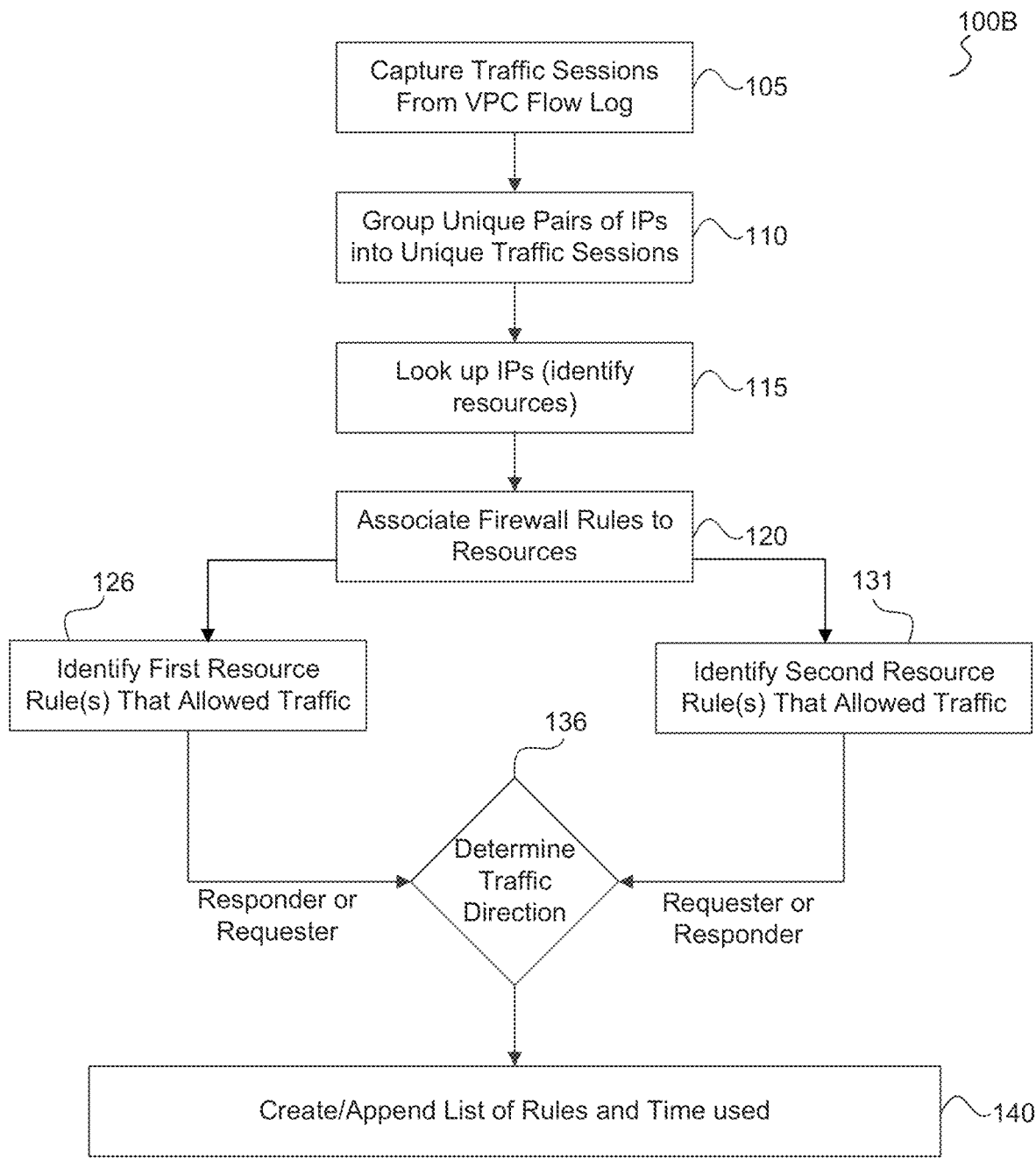

FIG. 1B is a flow diagram of a method 100B for performing automated security rule feedback, according to an alternative embodiment having a modified sequence of operations 126 to 136. As noted above, reference numbers here can indicate identical, functionally similar, and/or structurally similar elements to those described above in the embodiment of FIG. 1A. Specifically, operations 105 to 120 and 140 are identical or similar to those operations described in the embodiment of FIG. 1A.

A log file may provide sufficient information to permit the direction of traffic to be accurately deduced. After a pair of network interfaces is determined in operation 120, the respective rules of the first and second set of security rules associated with each of the pair of network interfaces can be analyzed to determine one or more specific rules that enabled the network traffic underlying the group of traffic records to occur.

For example, in operations 126 and 131, the rules applicable to a first resource (e.g., first NIC) and a second resource (e.g., second NIC), respectively are analyzed to determine whether they would permit characterization of each of the first resource and the second resource as the ingress node or egress node with respect to the permitted traffic session. A network security rule topology of a VPC may be fully restrictive and require an enabling rule to permit any traffic session. Thus, a pair of properly configured firewall systems (i.e. ones that are not fully open/excepted) can be configured to permit connection over a specific pair of ports in a specific direction (for example, to prevent outbound requests from being sent from listener ports). Thus, in some embodiments, the rules can be effectively analyzed to determine the direction of the network traffic.

Then, once the respective security rules are identified at operations 126 and 131 that permit the traffic session at operation 136, a determination can be made by an analyzing process as to what direction traffic flowed for the grouped pair of traffic records. For example, operation 136 can make a determination that the first resource is an egress node (e.g., requester) and that the second resource is the ingress node (e.g., responder). As in operation 125 above, the determination can be based on an analysis of the identification of associated resources, such as the resource, the rule sets to which the resource is assigned (e.g., a webserver rule set, database server rule set, and the like), the network traffic records themselves, or by any other information pertaining to identification of an ingress or egress characteristics of a group of traffic records.

Figure 2A:
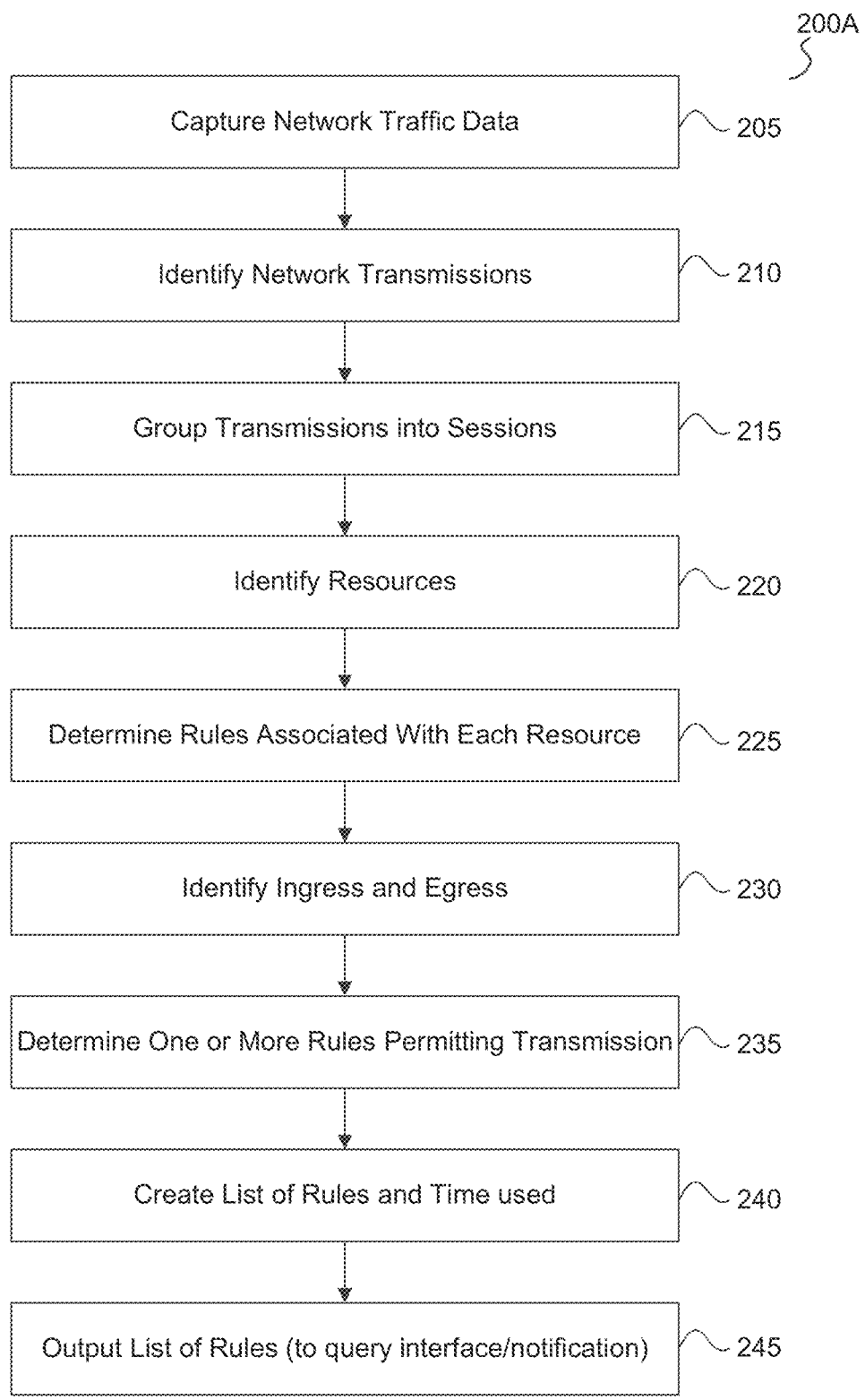
FIGS. 2A and 2B are flow diagrams of a method for providing automated firewall feedback to identify dispensable security rules, according to some embodiments.

FIG. 2A is a flow diagram of a method 200 for performing automated firewall feedback to identify one or more dispensable firewall rules, according to some embodiments of the present disclosure. In some embodiments, method 200 performs automated firewall feedback by determining a network traffic direction or flow. In some embodiments of method 200, automated firewall feedback identifies one or more dispensable network security rules, such as a dispensable firewall exception. Based on the disclosure herein, operations in method 200 can be performed in a different order and/or vary. In some embodiments, method 200 includes a process for identifying the direction of network traffic that includes a determination of whether a specific rule or node corresponds to a network traffic ingress or egress. In some embodiments, a list of rules can be compiled designating each rule determined to have allowed a transmission between nodes.

At operation 205, traffic records (e.g., network traffic data corresponding to traffic sessions) can be captured from a flow log (e.g., network traffic log) of a communication network. In some embodiments, the communication network can be a VPC. In some embodiments, operation 205 can be configured in a batch process to capture sessions from a VPC flow log between every four to eight minutes. For example, operation 205 can be configured to capture traffic every four minutes, every five minutes, every six minutes, every seven minutes, or every eight minutes, etc. In some embodiments, operation 205 can be configured in a batch process to capture a number of traffic sessions. For example, operation 205 can be configured to capture the preceding 20,000 network traffic sessions from a VPC flow log, or the like. In some embodiments, operation 205 can be configured to receive traffic sessions by a real time process from a VPC flow log instead of by a batch process.

At operation 210, the records of a network traffic database can be reduced or filtered to records that resulted in a network transmission. In some embodiments, operation 210 can include a process for making a determination that the records include information indicating that a transmission was permitted, such as an action field or flag indicating a permitted transmission. In some embodiments, the determination may be to exclude traffic records having information that indicates a transmission was rejected.

At operation 215, one or more traffic records of the network transmissions can be assembled into groups of two traffic records paired by IP addresses. For example, two traffic records can share corresponding source and destination addresses (e.g., ports) and capture times. Upon determining that two traffic records share corresponding addresses, the two traffic records can be categorized as a pair or group in operation 215.

In some embodiments directed to performing automated firewall feedback in accordance with a batch processing operation, traffic records can be assembled into unique pairs in order to optimize the batch process. In other embodiments (e.g., performing real time automated firewall feedback), operation 215 can be omitted and method 200A proceeds to operation 220 without grouping pairs of traffic records.

For example, a traffic record may include at least one IP address identifying a requester or intended recipient (e.g., responder) of a given network traffic session. The traffic record may include at least one port identifying a communication port of the requester or intended recipient of the network traffic session. One or more IP addresses and/or ports provided in a first record can be determined to correspond to one or more IP addresses and/or ports provided in a second record. In some embodiments, the grouping may involve a determination of a common capture time shared by the first and second records.

in some embodiments, the traffic record may include a source address and source port and destination address and destination port. The source address and source port and destination address and destination port of a first record may correspond to source address and source port of a second record, and capture time may correspond between the first and second records. In some embodiments, the first record is identified in a pairing with the second record. For example, destination address and destination port of a first record corresponds to source address and source port of a second record, and capture time corresponds between the first and second records. In this case, the first record can be identified in a pairing with the second record, the common IP address may be a first IP address of the first record and a second IP address of the second record.

At operation 220, one or more resources corresponding to each record of a group of traffic records can be identified. In some embodiments, operation 220 includes identifying a network interface associated with one or both of the two paired traffic records. In some embodiments, operation 220 performs a query or lookup process. For example, operation 220 may submit a lookup request to a resource database to identify a resource belonging to a given IP address. For example, operation 220 can query resources, such as network interfaces, respectively belonging to the IP address provided in the first record and second record. Based on their respective IP addresses, operation 220 can query a resource database to identify a first network interface card (NIC) as belonging to the first IP address and a second NIC belonging to the second IP address.

At operation 225, one or more security rules, such as one or more firewall exceptions, can be associated to each identified resource. In some examples, a first set of firewall rules is identified to be associated with a the first NIC and a second set of firewall rules is identified to be associated with the second NIC. In some embodiments, operation 225 includes a query or lookup process including submitting a request to a database to determine which security rule sets are based on a given network interface.

In some embodiments, the results of operations 220 and 225, i.e., the query results of one or more resources and one or more security rules, respectively, can be cached to optimize performance of the automated firewall feedback process. That is, query results can be cached to avoid unduly repeating query operations. A cached object can be provided set to an expiration time based on a pre-determined cache period or other criteria.

At operation 230, a determination can be made by an analyzing process as to what direction traffic flowed for the grouped pair of traffic records. For example, operation 230 can make a determination that the first network interface is an egress node (e.g., requester) and that the second network interface is the ingress node (e.g., responder). The determination can be based on analyzing the first set of firewall rules and the second set of firewall rules. In some embodiments, the determination can be based on an analysis of the identification of associated resources, such as the NIC, the rule sets to which the NIC is assigned (e.g., a webserver rule set, database server rule set, and the like), the network traffic records themselves, or by any other information pertaining to identification of an ingress or egress characteristics of a group of traffic records.

At operation 235, the respective rules of the first and second set of firewall rules can be analyzed to determine one or more specific rules that enabled the network traffic underlying the group of traffic records to occur. In some embodiments, operation 235 can be similar to operations 130 and 135 discussed above, with reference to FIG. 1A. For example, in operation 235, if the second NIC can be determined to be the ingress node, then the rules applicable to ingress traffic of the second set of firewall rules can be analyzed. A determination can thus be made based on the grouped records, such as the second IP address and second port, as to what specific subset of rules of the second set of firewall rules permitted the traffic session to occur. In some embodiments, if the first NIC is determined to be the egress node, then the of rules applicable to egress traffic of the first set of firewall rules can be analyzed. Thereby, a determination can be made based on the first record as to what specific rules of the first set of firewall rules permitted the traffic.

At operation 240, the specific rules identified in operation 230 can be provided to a list or database or other appropriate medium. For example, the specific rules can be provided by writing, modifying or appending a database or other notification platform (e.g., email notification, push notification or the like). A capture time, such as a start time and an end time, for the analyzed traffic session can also be provided in the medium. The capture time can be in UNIX time format, for example.

At operation 245, the list may be provided to a query interface or notification process. The medium can be provided in a suitable interface enabling a user to query the medium, alone or in combination with another record set, such as a network traffic database, the resources database or the security rules database. A query interface according to some embodiments can enable a user to identify at least one dispensable security rule. For example, the query interface may enable a user to identify any rule stored in the resources database corresponding to the first NIC that is not included in the output list of invoked security rules. In some embodiments, a query can be performed identifying two or more security rules that permitted one network interface (e.g., the first NIC to communicate with the other network interface (e.g., the second NIC).

For example, a user can query a list of invoked rules (e.g., a population of security rules) from the database to identify a plurality of redundant rules (e.g., redundant firewall exceptions). The identification of one or more dispensable rules may be based on a determination of redundancy, e.g., that each rule permitted the same communication session. Or, for example, a user can query the list to identify one or more dispensable rules that have not been invoked in some period of time, such as a week or a month (such as unused firewall exceptions). Thereby, the user is enabled to dispense or remove such dispensable (i.e., redundant or unused) rules from a rule set.

In some embodiments, the first and second records further comprise corresponding first and second record traffic actions to permit traffic. In some embodiments, the identifying the ingress node comprises determining that the first security rule population corresponding to the first network interface permitted ingress traffic with the first network interface; or the second security rule population corresponding to the second network interface permitted ingress traffic with the second. network interface.

In some embodiments, determining the direction of network traffic further can include identifying an egress node selected from the first and second network interfaces, wherein the egress node is selected based on the first and second security rule populations by determining that the first security rule population corresponding to the first network interface permitted egress traffic with the first network interface; or the second security rule population corresponding to the second network interface permitted egress traffic with the second network interface.

Figure 2B:
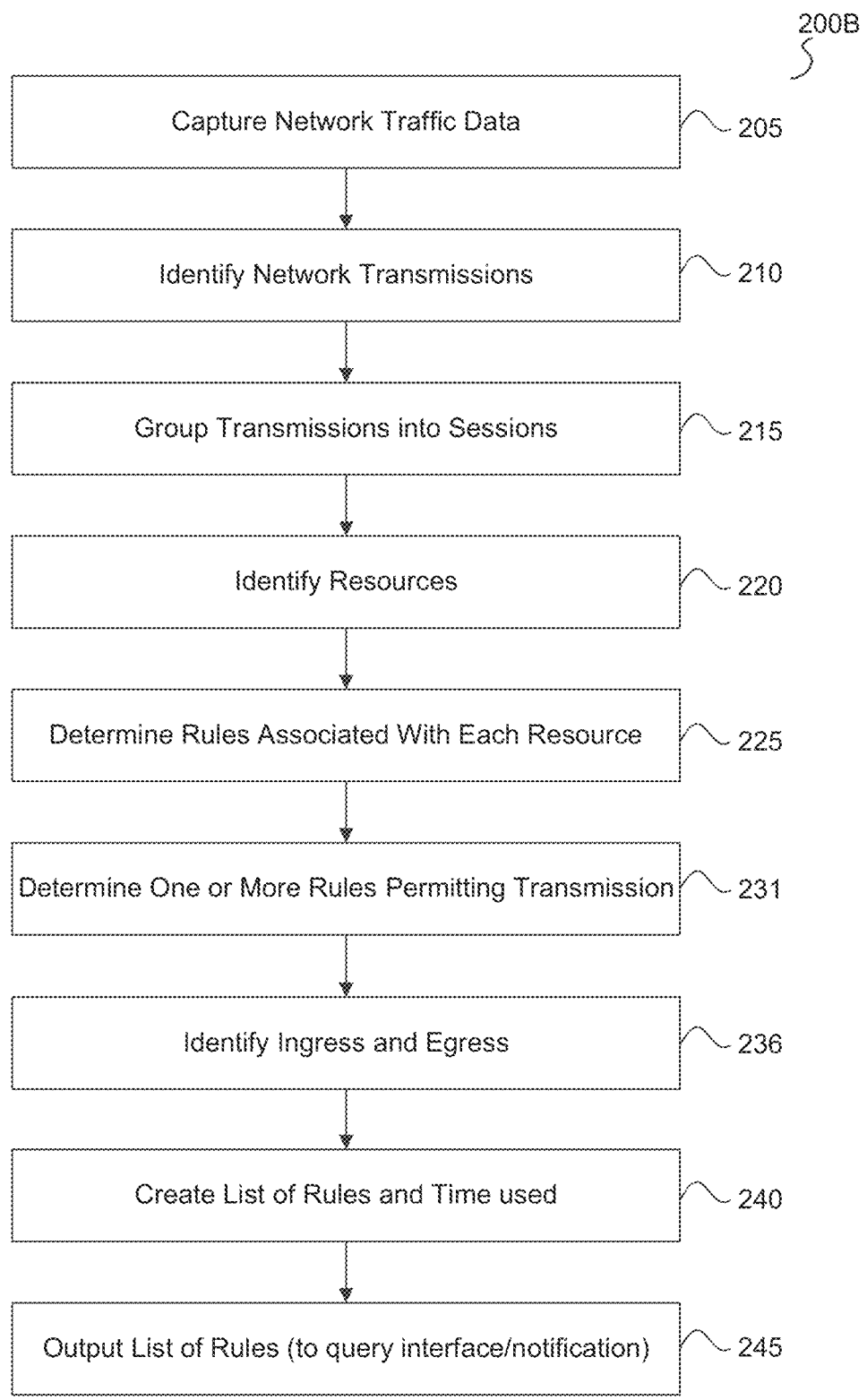

FIG. 2B is a flow diagram of an alternate sequence of method 200B, reordering operations 226 and 231 for performing automated firewall feedback to identify one or more dispensable firewall rules, according to some embodiments of the present disclosure. As noted above, reference numbers here can indicate identical, functionally similar, and/or structurally similar elements to those described above in the embodiment of FIG. 2A. Specifically, operations 205 to 225 and 240 to 245 are identical or similar to those operations described in the embodiment of FIG. 2A.

In this alternate sequence, after completion of operation 220, the security rules have been determined for each identified resource of a traffic session. At operation 226, the rules of the first and second set of firewall rules are analyzed to determine one or more specific rules that enabled the network traffic underlying the group of traffic records to occur. For example, in operation 231, the enabling rules applicable to ingress traffic of are analyzed to identify which of the first NIC or second NIC is the ingress node and which is the egress node.

At operation 236, the direction of network traffic can be determined based on the result of the above operation 231 to determine which of the pair of resources constituted an ingress node and an egress node, respectively. The determination can be based, for example, on analyzing the first set of firewall rules and the second set of firewall rules, the determination can be based on an analysis of the identification of associated resources, such as the NIC, the rule sets to which the NIC is assigned (e.g., a webserver rule set, database server rule set, and the like), the network traffic records themselves, or by any other information pertaining identification of the direction of network traffic. For example, in operation 236, the first NIC can be determined based on the enabling rules identified in operation 231, to be an ingress or egress node. Likewise, the second NIC can be determined to be the other of the ingress and egress node. Thereby, a determination can be made based as to the direction of the permitted traffic.

At this point, the flow of method 200B can continue with respect to operations 240 and 245, as in the embodiment of method 200A above. Specifically, the rules identified in operation 231 can be provided to a list or database or other appropriate medium at operation 240 and at operation 245, the list may be provided to a query interface or notification process.

EXAMPLES

Automated Firewall Feedback System and Method

FIGS. 3 to 8 illustrate an arrangement of an automated firewall feedback system and method, according to some embodiments. Examples can incorporate any of the embodiments disclosed herein to include methods and systems for providing firewall feedback based on network traffic analysis based on a determination that a rule or node corresponds to a network traffic ingress or egress. For example, a security rule topology can include instances and rule sets.

Figure 3:
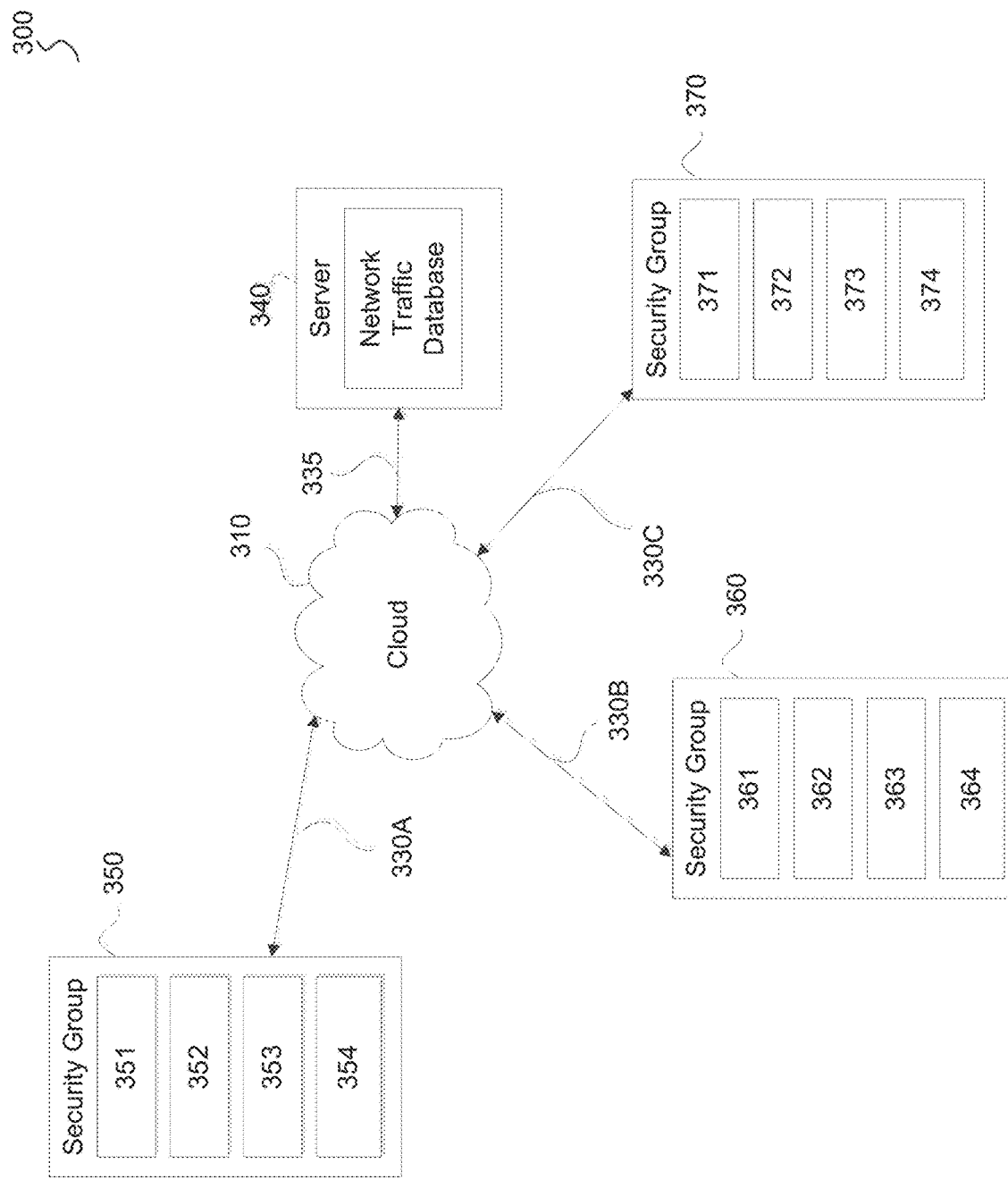
FIG. 3 is an illustration of a communication network, such as a virtual private cloud network, according to some embodiments.

FIG. 3 illustrates a block diagram of a communication network 300 that includes a number of security groups, for example, within a virtual private cloud. The communication network 300 includes a server 340 having a network traffic database, and one or more user security groups 350, 360, and 370.

Security groups 350, 360, and 370 can include one or more instances that share common security rules. For example, security group 350 includes instances 351, 352, 353, and 354. Instances 351 to 354 may have common attributes. By way of example, instances 351 to 354 may be web-servers. In this example, security group 350 can be configured to apply security rules applicable to a web-server operating environment. Security group 360 includes instances 361 to 364, and security group 370 includes instances 371 to 374. These instances can be physical or virtual and may be managed by different or same entities. Any number of instances can be included in a security group and an instance can be included in more than one security group.

In some embodiments, instances 351 to 354, 361 to 364, and 371 to 374 are in communication with one another, and the server 340 is in communication with each of the instances via a cloud communications network 310. As such, the server 340 and each of instances 351 to 354, 361 to 364, and 371 to 374 may be cloud based and thus may provide access from anywhere and at any time that the cloud communications network 330 is enabled.

In some embodiments, traffic sessions 330A to 330C can be communicated between instances 351 to 354, 361 to 364, and 371 to 374. Traffic sessions 330A to 330C can be captured via communication 335 and stored in a network traffic database of server 340. Security rules provided for each respective security group 350 to 370 can determine whether each traffic session 330A to 330C is permitted or rejected. A a security rule topology is described in greater detail below.

Figure 4:
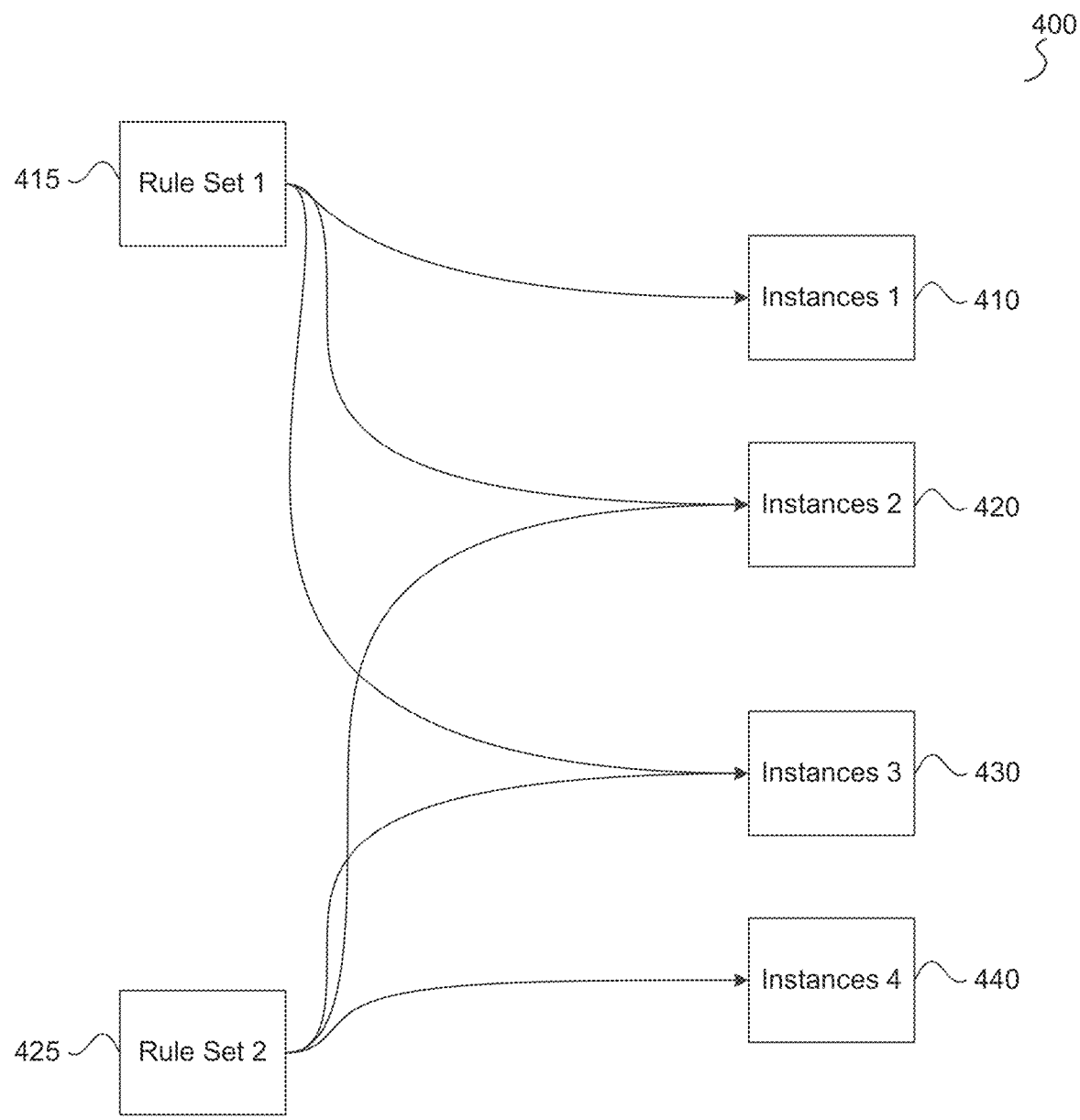
FIG. 4 is an illustration of a network security rule topology, according to some embodiments.

Referring to FIG. 4, a security rule topology 400 is illustrated to demonstrate the relationship between instances and rule sets, according to some embodiments. Security rule topology 400 includes, for example, resources 410, 420, 430, and 440 and first and second rule sets 415 and 425. One or more resource(s) 410 to 440 can be a member of one or more populations of rule set(s), such as first rule set 415 and second rule set 425, and vice-versa.

Resources, such as resources 410 to 440, can include one or more applications, devices, such as servers, including virtual servers, clients, and the like. Servers, including virtual servers, can include, for example, web servers, application servers, collaboration servers, mail servers, proxy servers, file transfer protocol (FTP) servers, ad servers, list servers, and servers directed to any other computerized process such as batch processing, artificial intelligence, data analytics, containerized microservices, caching fleets, distributed data stores, development environments, high-performance computing (HPC), machine/deep learning inference, highly scalable multiplayer gaming, video encoding, or the like.

Rule sets can include first rule set 415 and second rule set 425. First and second rule sets 415 and 425 can each include one or more rules related to network security. In some embodiments, a rule can include one or more instructions for a firewall to permit network traffic. In some embodiments, a rule can include a firewall exception instructing a firewall to permit network traffic on a specified port and involving a specific protocol. In some embodiments, a rule can include a source or destination address.

By way of example, resources 410, 420, 430, and 440 can respectively include one or more webservers, one or more database servers, one or more application servers, and one or more ad servers. For example, web server instances, such as resource 410, can include Apache, Internet Information Services (IIS), NGINX servers, or the like. Database server instances, such as resource 420, can include MySQL, SQL Server, Oracle servers, DB2 by IBM, SAP Sybase, or any other database server. In some embodiments, application server resource 430 can include financial fraud detection applications (e.g., ARGO™ Teller, CSFI Sentinel™, Fraudblock, and the like), lending and financing applications, such as Account Opening, Bill Pay, Entitlements (handling privilege federation for clients), Capital One Eno™ (an opt-in instanced smart-assistant to analyze secure data), healthcare applications, etc.

In some embodiments, each instance can correspond to one or more rule sets, each rule set including one or more security rules, such as firewall exceptions. For example, resources 410, 420, and 430 can be subscribed to first rule set 415. Resources 420, 430, and 440 can be subscribed to second rule set 425. First rule set 415 can include one or more firewall exceptions, such as to permit TCP (Transmission Control Protocol) communications received from IP subnet "10.0.0.0/24" on port 80. Second rule set 425 can include one or more firewall exceptions, such as to permit UDP (User Datagram Protocol) communications received from IP subnet "0.0.0.0/0" on port 67. Thus, resources 410 to 430 can subscribe to first rule set 415 such that a firewall associated with each instance permits TCP communications received from IP subnet "10.0.0.0/24" on port 80. Resources 420 to 440 can subscribe to second rule set 425 such that a firewall associated with each instance permits UDP communications received from IP subnet "0.0.0.0/0" on port 67.

As would be appreciated by a person having ordinary skill in the art, any communication protocol, IP address, port or other attribute can be referenced with respect to first and second rule sets 415 and 425. For example, any IANA (Internet Assigned Numbers Authority) protocol can be referenced.

Figure 5:
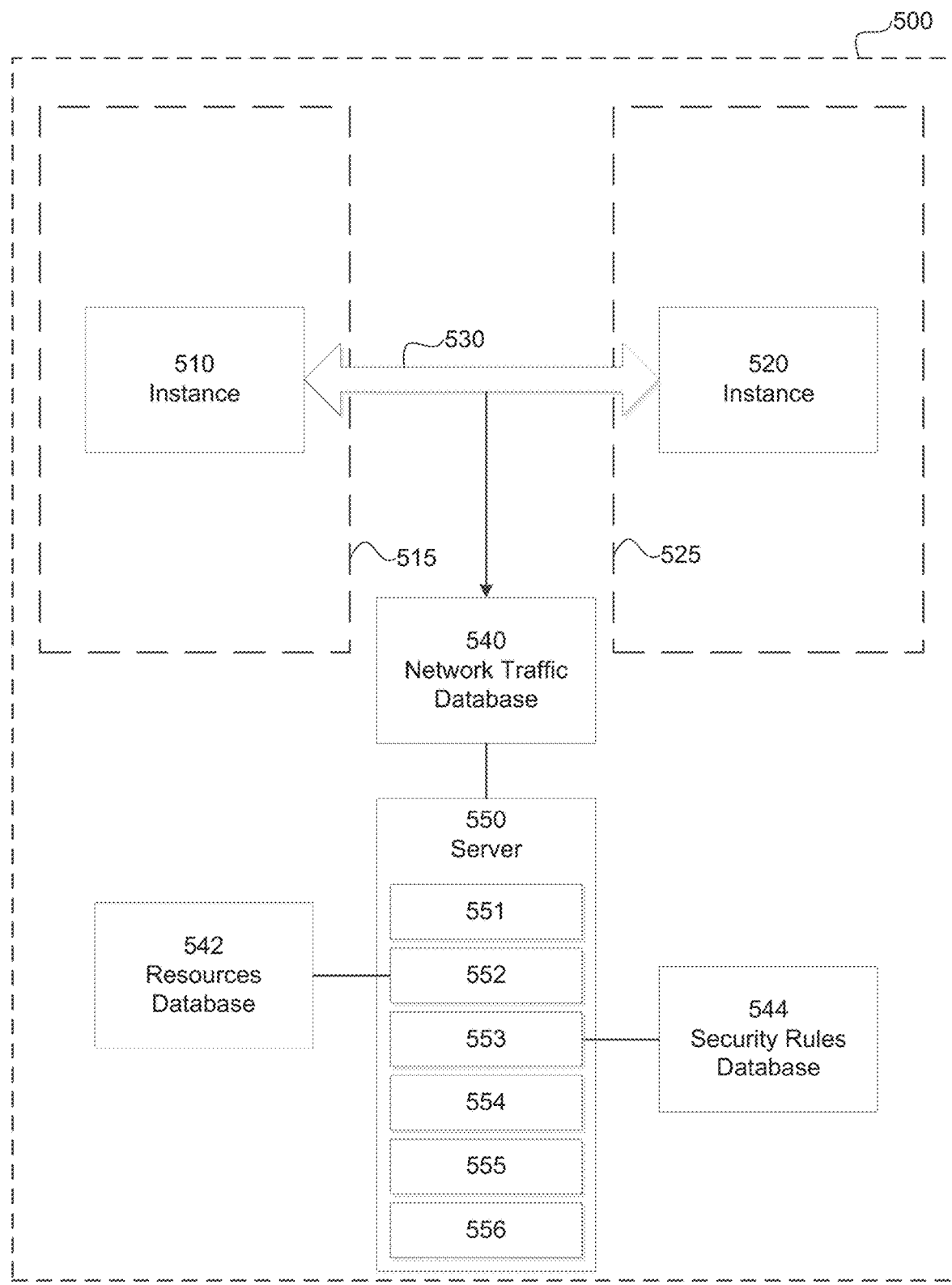
FIGS. 5 is an illustration of a system for providing automated firewall feedback, according to some embodiments.

FIG. 5 illustrates an automated firewall feedback system 500, according to some embodiments. Automated firewall feedback system 500 can include one or more instances, such as instances 510 and 520. The automated firewall feedback system 500 can exist in a cloud network, such as a private cloud-based computer network. Instance 510 and instance 520 can respectively be members of resources 410 and 420. Also, instance 510 and instance 520, for example, are maintained within firewall systems 515 and 525, respectively, in coordination with one or more rule sets. For example, firewall systems 515 and 525 can be subject to firewall exceptions contained in first and second rule sets 415 and 425, respectively.

In some embodiments, in accordance with rules included in first and second rule sets 415 and 425, one or more network traffic sessions 530 can be permitted to flow or, alternatively, rejected by firewall system 515 or firewall system 525 between instances 510 and 520. Information about network traffic session 530 can be captured in network traffic database 540. The structure of an exemplary network traffic database is described below with reference to FIG. 7, according to some embodiments.

In some embodiments, automated firewall feedback system 500 can include at least one server 550, coupled with at least one processor. Server 550 can be configured to execute one or more instructions, for example, which can be stored in one or more software modules in a memory structure.

For example, server 550 can include software modules 551 to 556. Grouping module 551 can assemble one or more records of network traffic database 540 into groups of two traffic records paired by IP addresses. For example, grouping module 551 can determine, for example, that two traffic records share corresponding source and destination addresses (and ports) and capture times. if so, grouping module pairs the two traffic records.

In some embodiments, Network Interface Identification module 552 identifies a network interface associated with one or both of the two paired traffic records. In some embodiments, Network Interface Identification module 552 can query a database, such as resources database 542, for identification of a network interface based on an associated IP address. For example, based on grouped traffic records pairing instances 510 and 520 IP addresses, network interface identification module 552 determines an associated network interface for each of instances 510 and 520. Based on their respective IP addresses, network identification module 552 can query resources database to retrieve "NIC1" for instance 510 and "NIC2" for instance 520.

In some embodiments, security rule identification module 553 associates one or more security rules corresponding to the network interface. In some embodiments, security rule identification module 552 can query a database, such as security rules database 542, for identification of a rule set based on an associated network interface. For example, security rule identification module 552 queries security rules database 542 to retrieve first rule set 415 for "NIC1" and second rule set 425 for "NIC2" (corresponding above to instances 510 and 520).

In some embodiments, rule analysis module 554 can determine one or more security rules that permitted the network interface to communicate with another network interface, the other network interface being associated with another of the two traffic records. In some embodiments, the rule analysis module 554 can determine the direction of network traffic in the given network traffic session 530. For example, rule analysis module 554 can perform a process to identify which of instances 510 and 520 respectively represent an ingress node or egress node for the given traffic session. If instance 510 is determined to be an ingress node, then ingress rules of first rule set 415 can be analyzed for determining a subset of the ingress rules that permitted Thereby, the rule sets corresponding to each instance (for example, based on the associated network interface) can be analyzed based on the applicable ingress or egress rules in the process of identifying qualified rules permitting the traffic session.

In some embodiments, output module 555 is configured to output invoked security rules that were identified in rule analysis module 554. The output can be provided, for example, by writing, modifying or appending a database or other notification platform (e.g., email notification, push notification or the like). The output can also include a session time, such as a start time and an end time, which can be in UNIX time format, for example. The invoked security rule can include one or more dispensable security rules, whereby the recording of the invoked security rules by output module 555 enables the automated firewall feedback system 500 to identify or facilitate identification of the dispensable security rule.

In some embodiments, query module 556 can be configured to allow a user to query a database output by output module 555, alone or in combination with another database, such as network traffic database 540, resources database 542 or security rules database 544. In some embodiments, the identifying at least one dispensable security rule involves the determination that a rule stored in resources database 542 corresponding to the network interface (e.g., "NIC1") is not included in the output list of invoked security rules. In some embodiments, a query can be performed identifying two or more security rules that permitted one network interface (e.g., "NIC1" to communicate with the other network interface (e.g., "NIC2").

For example, a user can query a list of invoked from the database to identify a plurality of redundant rules (such as redundant firewall exceptions), each of which having been determined to permit the same communication session. Or, for example, a user can query the list to identify one or more rules that have not been invoked in some period of time, such as a week or a month (such as unused firewall exceptions). Thereby, the user is enabled to dispense or remove such redundant or unused rules from the rule set associated with a given instance, such as instances 510 and 520.

Figure 6:
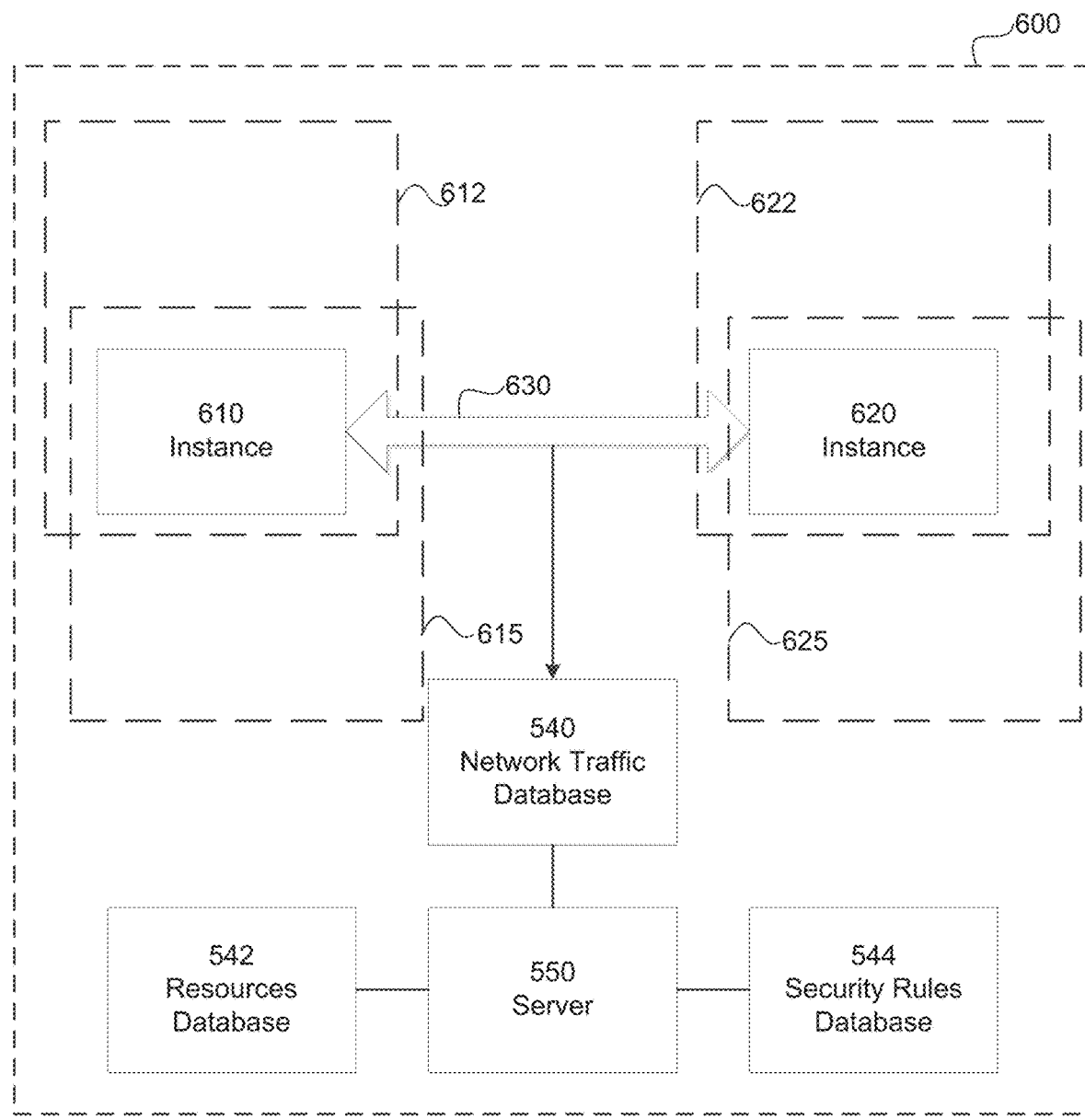
FIG. 6 is an illustration of a system for providing automated firewall feedback, according to some embodiments.

FIG. 6 illustrates an automated firewall feedback system 600, according to some embodiments. In some embodiments, automated firewall feedback system 600 can be configured similarly to automated firewall feedback system 500 of FIG. 5.

As shown in FIG. 6, one or more instances, such as instances 610 and 620 may each be assigned to multiple firewall rule sets. For example, instance 610 may be assigned a firewall system based on an ingress rule set 612 and an egress rule set 615. Instance 620 may be assigned a firewall system based on an ingress rule set 622 and an egress rule set 625. The automated firewall feedback system 600 can be provided in a cloud network, such as a private cloud-based computer network.

In some embodiments, one or more network traffic sessions 630 can be rejected or permitted based on rules contained respectively within ingress rule sets 612 and 622 and egress rule sets 615 and 625. Information about network traffic session 630 can be captured in network traffic database 640, which may be an embodiment of network traffic database 740 described below with reference to FIG. 7. In some embodiments, elements in FIG. 6 with the same annotations as elements in FIG. 5 can operate as described above, such elements including network traffic database 540, resources database 542, server 450, and security rules database 544.

Figure 7:
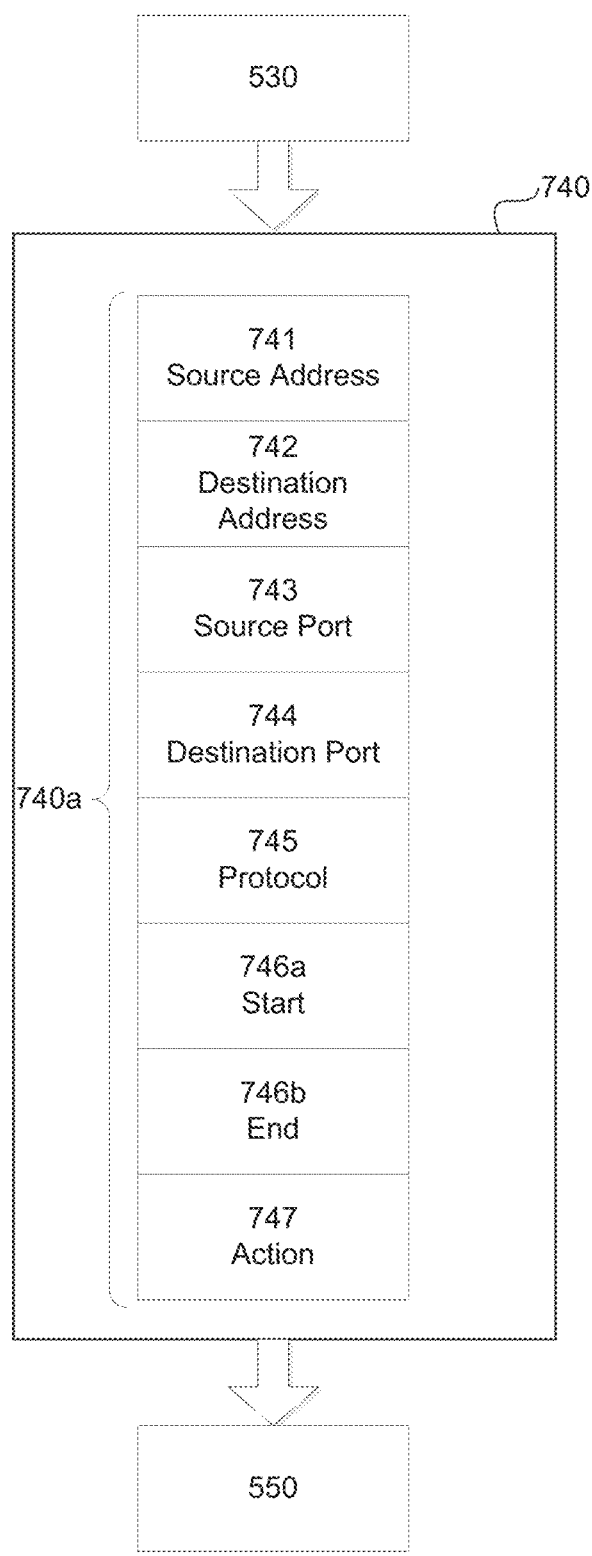
FIG. 7 is an illustration of a network traffic database, according to some embodiments.

FIG. 7 illustrates a database structure of a network traffic database 740, according to some embodiments. In this example, network database 740 is connected to and configured to receive traffic captured from network traffic session 530. Such traffic can be recorded in a record 740a of network traffic database 740.

In this example, record 740a is arranged to store a source address 741, destination address 742, source port 743, destination port 744, protocol 745, time 746 including start time 746a and end time 746b and an action 747.

In some embodiments, source address 741 and destination address 742 can capture, for example, an IP address (e.g., an IPv4 or IPv6 address) of the source and destination instances of an attempted network traffic session 530. Source port 743 and destination port 744 can capture, for example, a port (i.e., a channel) through which network traffic session 530 is attempted.

In some embodiments, protocol 745 captures the protocol, such as a protocol number, corresponding to the type of traffic attempted by network traffic session 530. For example, the recorded protocol can be an IANA protocol number of the traffic.

In some embodiments, the time fields, such as start time 746a and end time 746b capture the time corresponding to the capture window start and end times, respectively. In some embodiments, a single capture window time can be recorded instead of a start and end time. These times can be recorded in any time format, such as in Unix seconds, for example.

In some embodiments, the action 747 field captures the action associated with the traffic. For example, if a rule of one or more rule sets provided a firewall exception for the associated traffic, then the action can be recorded as "permit." Otherwise, if a firewall exception was not provided, the security group or rule set rejects the traffic such that the action is recorded as "reject."

In some embodiments, although not shown record 740a can include additional fields, such as fields describing a network interface for which the traffic session is recorded, traffic dimensions such as packet count or data size (e.g., in bytes).

Applicable Computer Systems

Figure 8:
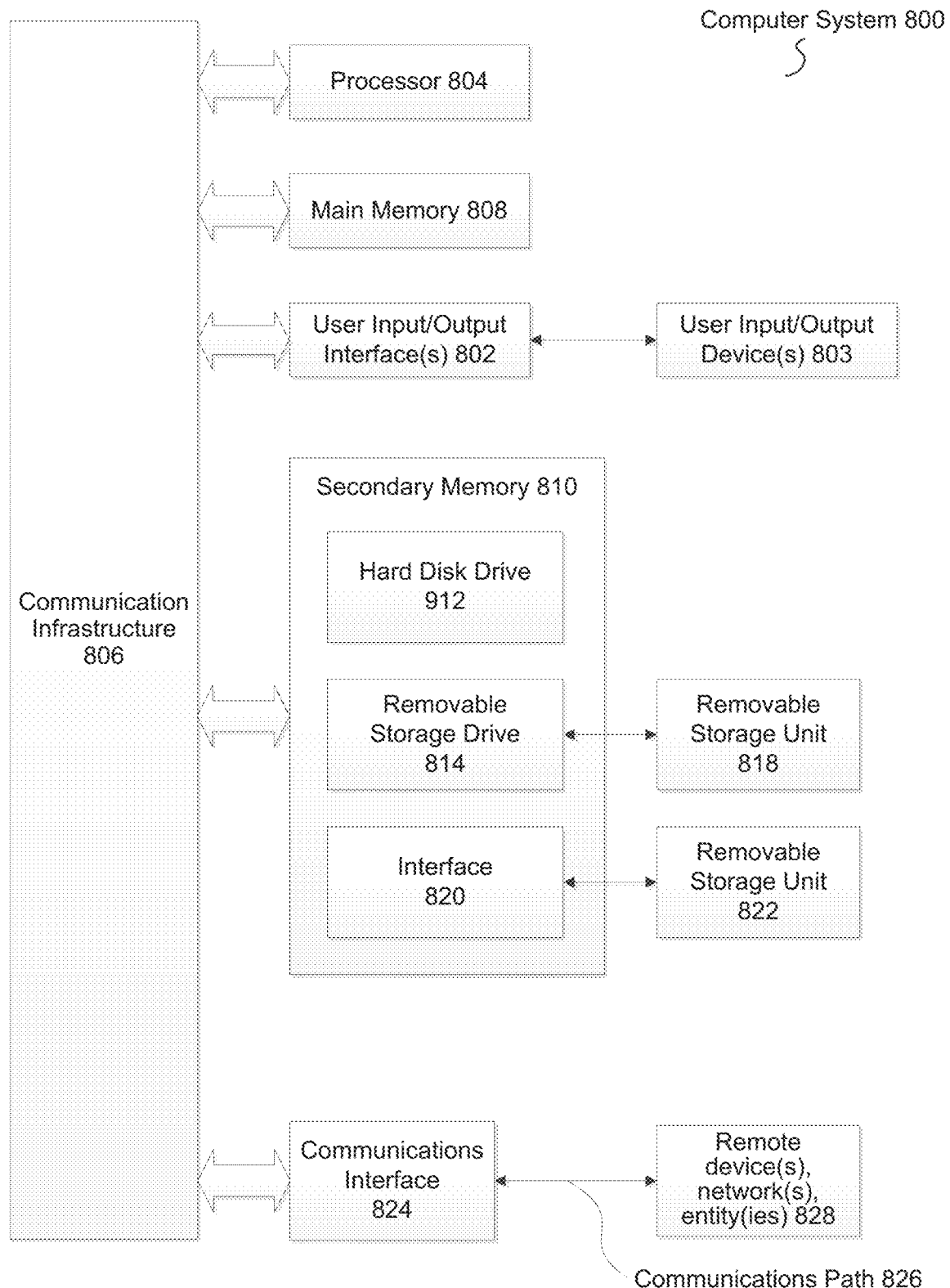
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to a removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smartphone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present embodiments as contemplated by the inventor(s), and thus, are not intended to limit the present embodiments and the appended claims in any way.

The present embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present embodiments should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A system enabling identification of at least one dispensable security rule comprising:
    a network traffic database that captures network traffic records generated on a private cloud-based computer network; and
    a server, coupled to a processor, and configured to execute instructions that:
        groups two traffic records with a common capture time selected from the captured network traffic records;
        identifies a network interface associated with one of the two traffic records;
        determines one or more security rules corresponding to the identified network interface associated with the one of the two traffic records, the one or more security rules relating to a firewall of the private cloud-based computer network;
        determines an invoked security rule from the one or more security rules associated with the one of the two traffic records, wherein the invoked security rule is determined to have permitted the identified network interface to communicate with another network interface, the other network interface being associated with another of the two traffic records; and
        modifies a list of invoked security rules to include the invoked security rule;
        determines to remove a security rule from the one or more security rules based on:
            (i) redundancy of the security rule as determined from the list of invoked security rules, or
            (ii) idleness of the security rule over a time period as determined from the list of invoked security rules.

2. The system of claim 1, wherein:
    the server identifies the at least one dispensable security rule from the one or more security rules, and
    the list of invoked security rules comprises a start time and an end time.

3. The system of claim 2, wherein:
    the server identifying the at least one dispensable security rule is based on a determination that the at least one dispensable security rule is not included in the list of invoked security rules.

4. The system of claim 2, wherein the server identifying the at least one dispensable security rule is based on a determination that two or more security rules permitted the network interface to communicate with the other network interface.

5. The system of claim 1, wherein:
the server determining the invoked security rule further comprises the server determining a direction of network traffic, and
the server determining the direction of network traffic comprises the server determining that one of the network interface and the other network interface corresponds to an ingress node.

6. A computer-implemented method for identifying at least one dispensable security rule comprising:
grouping, by at least one processor, two traffic records with a common capture time selected from a plurality of captured traffic records, each of the two traffic records comprising a source address identifier, a source port identifier, a destination address identifier, and a destination port identifier;
identifying, by the at least one processor, a first network interface associated with the source address identifier of one of the two traffic records;
determining, by the at least one processor, one or more security rules corresponding to the first network interface associated with the one of the two traffic records, the one or more security rules relating to a firewall of the private cloud-based computer network;
determining, by the at least one processor, an invoked security rule from the one or more security rules associated with the one of the two traffic records, the determining comprising determining that the invoked security rule permitted the first network interface to communicate with a second network interface corresponding to another of the two traffic records;
modifying, by the at least one processor, a list of invoked security rules to include the invoked security rule; and
determining to remove a security rule from the one or more security rules based on:
(i) redundancy of the security rule as determined from the list of invoked security rules, or
(ii) idleness of the security rule over a time period as determined from the list of invoked security rules.

7. The method of claim 6, wherein:
the list of invoked security rules comprises a start time and an end time, and
the identifying the at least one dispensable security rule is based on a determination that the at least one dispensable security rule is not included in the list of invoked security rules.

8. The method of claim 6, wherein:
the list of invoked security rules comprises a start time and an end time, and
the identifying the at least one dispensable security rule is based on a determination that two or more security rules permitted the first network interface to communicate with the second network interface.

9. The method of claim 6, further comprising connecting the first network interface and the second network interface within a private cloud-based computer network.

10. The method of claim 6, wherein the determining the invoked security rule further comprises determining a direction of network traffic.

11. The method of claim 10, wherein the determining the direction of network traffic comprises deciding that one of the first network interface and the second network interface corresponds to an ingress node.

* * * * *